United States Patent

Elfmark et al.

Patent Number: 5,891,275
Date of Patent: Apr. 6, 1999

[54] MODEL-ASSISTED PROCESS FOR THE CONTROLLED COOLING OF HOT STRIP AND PLATE IN A COMPUTER-GUIDED ROLLING AND COOLING PROCESS

[75] Inventors: Jiri Elfmark, Ostrava-Poruba, Czechoslovakia; Christoph Tischner; Christian Plociennik, both of Ratingen, Germany; Roman Dehmel, Grevenbroich, Germany

[73] Assignee: Mannesmann Aktiengesellschaft, Düsseldorf, Germany

[21] Appl. No.: 931,603

[22] Filed: Sep. 16, 1997

[51] Int. Cl.$^6$ ............................................. C21D 8/02
[52] U.S. Cl. .................................... 148/654; 148/511
[58] Field of Search ............................ 148/654, 511, 148/661

[56] References Cited

U.S. PATENT DOCUMENTS

| 5,531,842 | 7/1996 | Koo et al. | 148/654 |
| 5,601,667 | 2/1997 | Takahashi et al. | 148/654 |

FOREIGN PATENT DOCUMENTS

| 0 086 265 | 8/1983 | European Pat. Off. | C21D 9/573 |
| 0 178 378 | 4/1986 | European Pat. Off. | C21D 9/573 |
| 0 453 566 | 10/1991 | European Pat. Off. | C21D 8/02 |
| 58-113327 | 7/1983 | Japan | 148/511 |
| 60-218431 | 10/1985 | Japan | 148/511 |

OTHER PUBLICATIONS

Leitholf et al., "Model Reference Control of Runout Table Cooling at LTV", Aug. 1989, pp. 31–35.

Pawelski, et al., "Investigation of Direct Cooling In Drawing Steel Wire", 1984, pp. 57–62.

Dr. Ing. Habil, "Technologie de Wärmebehandlung von Stahl", Nov. 14, 1988.

*Primary Examiner*—Deborah Yee
*Attorney, Agent, or Firm*—Cohen, Pontani, Lieberman & Pavane

[57] ABSTRACT

A metal-physical model is used in a computer controlled cooling device for a rolling and cooling process for rolling a hot strip or a plate. The cooling parameters are calculated based on initial conditions. The computer uses the metal physical model to instantaneously alter the cooling parameters in response to changes in the final rolling temperatures and the rate at which the hot strip or plate is moved through the cooling device.

5 Claims, 1 Drawing Sheet

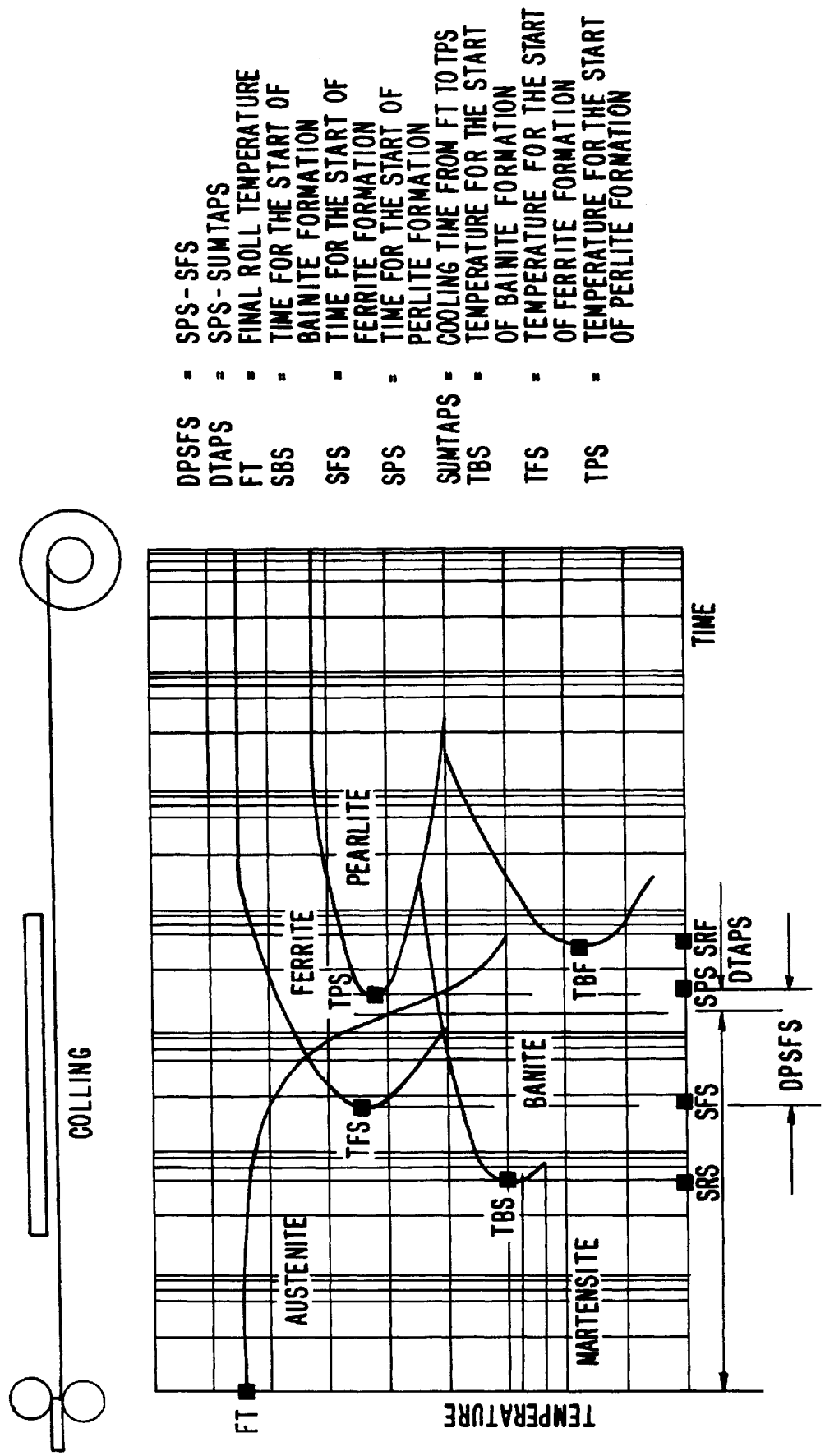

MODEL-ASSISTED PROCESS FOR THE CONTROLLED COOLING OF HOT STRIP AND PLATE IN A COMPUTER-GUIDED ROLLING AND COOLING PROCESS

BACKGROUND OF THE INVENTION

1. Field of the Invention

The present invention relates to controlling the cooling rate and cooling time for a hot strip or plate after the final rolling of the hot strip or plate. More specifically, the present invention relates to a model-assisted process for controlling the cooling of the hot strip or plate in controlled rolling and cooling processes where a structure (hot strip or plate) of hardened austenite is final rolled in temperature ranges in which no recrystallization occurs and is cooled in a controlled fashion, in that it is transported at a controlled speed through the cooling device.

2. Description of the Related Art

Optimal quality in microalloyed steels is dependent on the formation of a very fine-grained secondary structure with favorable combinations of properties during the transformation in the cooling line of the austenite that has not recrystallized or has recrystallized only partially. The optimal values for this austenite hardening result from 70–80% reduction at low temperatures (below 900° C.). What is vital is that the hardened state of the deformed and hardened austenite be maintained to the point of the $\gamma/\alpha$ transformation. Maintaining the hardened state until that transformation depends on the conditions for the precipitation of the microalloy elements and the retardation of recrystallization this causes. In addition to maintaining the hardening of the fine austenitic grains, it is necessary to carry out deliberate cooling, so that the structure obtained after transformation consists for the most part of ferrite and bainite. Pearlitic structures are undesirable. Changes in the final roll temperature during processing and changes in the speed of processing affect the above transformation and change the final ratio of the structural phases of the steel. These changes in the ratio of structural phases of the steel alter the characteristics of the steel. Therefore, a problem with conventional cooling of the final rolled hot strip or plate is that inevitable fluctuations in the final roll temperature and processing speed result in a final product having non-uniform characteristics.

SUMMARY OF THE INVENTION

It is an object of the present invention to ensure, with the help of a metal-physical process model, that the ratio of structural phases of steel being processed is the same when changes occur in the final roll temperature (FT) and processing speed (R) as under constant process conditions.

This object is attained according to the invention by a metal-physical process model, which includes a material modulus for calculating time-temperature transformation diagrams (TTT diagrams) as a function of the chemical composition, the deformation, and the cooling parameters. The metal-physical model performs a set-up calculation to determine the required water quantity and distribution of water in the cooling line for the present final roll temperature and the present speed of processing, and also to determine the dynamic reference input curve which will be used to determine how much to change the cooling parameters when a deviation in final roll temperature or processing speed occurs. Cooling is thereby controlled such that the cooling curve in the TTT diagram calculated for the material to be cooled runs between the nose points of the ferritic and pearlitic transformation curves. Maintaining this cooling curve ensures that the cooling results in the formation of a ferritic-bainitic structure with the particular ratio between ferrite and bainite that was calculated in advance.

The basic foundation of the process according to the invention is the metal-physical process model, which improves the control engineering and the physical-metallurgical control of the cooling devices for maintaining the requisite material properties over the entire hot strip or plate length.

The present invention further includes the proposition that the position of the cooling curve at the temperature at which pearlite formation begins (pearlite nose point) is defined by a ratio XTAPS between, on the one hand, the difference between the time logarithm needed to create pearlite and the time logarithm for cooling the rolled material from the final roll temperature to the temperature of the pearlite nose point and, on the other hand, the difference between the time logarithm needed for the pearlite nose point and the time logarithm needed for the beginning of ferrite transformation (ferrite nose point), whereby this XTAPS ratio is less than 1 and greater than 0.

Optimal quality in microalloyed steels is dependent on the formation of a very fine-grained secondary structure with favorable combinations of properties during the transformation in the cooling line of the austenite that has not recrystallized or has recrystallized only partially. The optimal values for this austenite hardening result from 70–80% reduction at low temperatures (below 900° C.). What is vital is that the hardened state of the deformed and hardened austenite be maintained to the point of the gamma/alpha transformation. Maintaining the hardened state until said transformation depends on the conditions for the precipitation of the microalloy elements and the retardation of recrystallization this causes. In addition to maintaining the hardening of the fine austenitic grains, it is necessary to carry out deliberate cooling, so that the structure obtained after transformation consists for the most part of ferrite and bainite. Pearlitic structures are undesirable.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

The only Figure shows the calculated TTT diagram of a microalloyed steel during a controlled cooling.

DETAILED DESCRIPTION OF THE PRESENTLY PREFERRED EMBODIMENTS

The properties of a rolled steel are influenced substantially by the cooling rate after the final roll in the temperature range between 800° and 500° C. The cooling rate influences the size of the ferritic grain and thus the elasticity limit. To achieve an adequate cooling rate (K/s) for the rolled material and carry out a $\gamma/\alpha$ transformation in the steel, the steel is cooled by exposure to water after the rolled material leaves the final roll stand at a final roll temperature FT. The cooling intensity depends on the length L (m) of the active cooling line and on the rate of movement R (m/s) of the rolled material through the cooling area. Referring to the Figure, if the time of the nose of ferrite formation is designated SFS, and the time of the nose of pearlite formation is designated SPS, and the cooling time of the strip from FT to the temperature of the nose of pearlite formation (TPS) is designated SUMTAPS, the resulting difference between the timepoint SPS (at which pearlite formation begins) and the cooling time SUMTAPS is as follows:

ln(DTAPS)=ln(SPS)−ln(SUMTAPS)

Analogous to this, the difference between the timepoints for ferrite formation and pearlite formation is as follows:

ln(DPSFS)=ln(SPS)−ln(SFS)

The position of the cooling curve between the timepoints for ferrite formation and pearlite formation is characterized by the ratio XTAPS:

XTAPS=ln(DTAPS)/ln(DPSFS)

To obtain a pure ferritic-bainitic structure, XTAPS must be less than 1 and greater than 0.

The above process conditions for cooling refer to static processing conditions. During actual rolling processes, however, it is not possible to completely avoid deviations in the deformation parameters, particularly insofar as the final roll temperature FT and rate of movement R are concerned.

A higher final roll temperature reduces the hardening of the austenite, which simultaneously changes the timepoints for ferrite formation (SFS) and pearlite formation (SPS). If the preset cooling conditions of the model were to remain unchanged, the modified finish-rolling conditions would cause a change in the value of XTAPS. The ratio of the structural phases of ferrite and bainite would change which would change the expected properties of the strip being processed.

The object of the invention, i.e., ensuring that the ratio of the structural phases is maintained when changes occur in the final roll temperature FT and the rate of movement R, is attained by using the metal-physical process model containing the material modulus for calculating time-temperature diagrams (TTT diagrams) as a function of the chemical composition and the deformation and cooling parameters.

A computer for controlling the cooling device includes a program which first calculates the required water quantity and distribution of the water in the cooling line for the present final roll temperature and the present speed of processing. The computer then calculates a dynamic reference input curve which will be used to determine required changes in the cooling parameters of the cooling device when a deviation in final roll temperature or processing speed occurs.

The computer uses the metal-physical process model and material modulus for these calculations. During processing, the computer calculates new times for the formation of ferrite and pearlite in relation to the particular measured values of the final roll temperature FT and rate of movement R of the rolled material leaving the final stand. For these new conditions, the computer calculates a new cooling rate CR as well as the length of the active water line in the cooling line.

The new times for the formation of ferrite and pearlite are calculated such that when an increase or decrease occurs in the final roll temperature FT or in the rate of movement R, the cooling rate changes. If the final roll temperature FT of the rate of movement R of the rolled material changes, the length of the active cooling line is shortened or lengthened at the beginning or the end so that the total cooling time for a cross-section of rolled material passing through the cooling device is equal to or less than the cooling time that results from the previously calculated difference between the temperature at entry and at run-out of the cooling device divided by the cooling rate. By the combination of the described changes in cooling rate and length of active cooling line, the XTAPS ratio achieves the previously calculated optimal value if not completely, at least approximately, thereby reducing the amount of deviation in characteristics along the rolled hot strip or plate.

The invention is not limited by the embodiments described above which are presented as examples only but can be modified in various ways within the scope of protection defined by the appended patent claims.

We claim:

1. A model-supported process for the controlled cooling in rolling and cooling processes of one of a hot strip and a plate comprising the steps of:

rolling said one of a hot strip and a plate through a final roll in a temperature range in which no recrystallization occurs, said one of a hot strip and a plate comprising hardened austenite;

calculating a time temperature transformation diagram (TTT diagram) as a function of a chemical composition of said hot strip or plate, a deformation of said hot strip or plate, and cooling parameters using a metal-physical process model which contains a material modulus;

calculating a required water quantity and distribution of said water in a cooling line for a present final roll temperature and a present rate of movement of said rolling and cooling process and calculating a dynamic reference input curve using said metal-physical process model and said material modulus;

cooling said one of a hot strip and a plate structure by transporting said one of a hot strip and a plate through a cooling device in accordance with said required water quantity and distribution of said water, such that a cooling curve in the calculated time-temperature transformation diagram of the material to be cooled runs between a nose point of a ferrite transformation curve and a nose point of a pearlite transformation curve and such that said cooling results in a formation of a ferritic-bainitic structure having a precalculated ratio between ferrite and bainite.

2. The model-supported process for the controlled cooling in rolling and cooling processes of one of a hot strip and a plate of claim 1, wherein said step of calculating a required water quantity comprises ensuring that a position of said cooling curve at a temperature of said nose of said pearlite curve is defined by a ratio between, on the one hand, the difference between a first time logarithm for creating pearlite and a second time logarithm for cooling the rolled material from said final roll temperature to said nose of the pearlite curve and, on the other hand, the difference between a third time logarithm for reaching said nose of said pearlite curve and a fourth time logarithm needed for reaching said nose point of said ferrite curve, and ensuring said ratio is less than 1 and greater than 0.

3. The model-supported process for the controlled cooling in rolling and cooling processes of one of a hot strip and a plate of claim 1, further including the step of changing a cooling rate of said cooling device responsive to each increase or decrease in said final roll temperature, insofar as a preset value of said final roll temperature does not remain constant.

4. The model-supported process for the controlled cooling in rolling and cooling processes of one of a hot strip and a plate of claim 1, further including the step of changing a cooling rate in said cooling device responsive to each increase or decrease in a rate of movement of said one of a hot strip and a plate, insofar as an actual rate of movement of said one of a hot strip and a plate at a run-out of said final stand differs from a preset value.

5. The model-supported process for the controlled cooling in directional rolling and cooling processes of hot strip or plate of claim 1, changing a total active length of said cooling line by removing or adding cooling units in a front or rear area to ensure that a cooling time of a cross-section of said one of a hot strip and a plate passing through said cooling device is equal to or less than a time resulting from a previously calculated difference between an entry temperature and a run-out temperature of said cooling line divided by said cooling rate.

* * * * *